Figure 1:
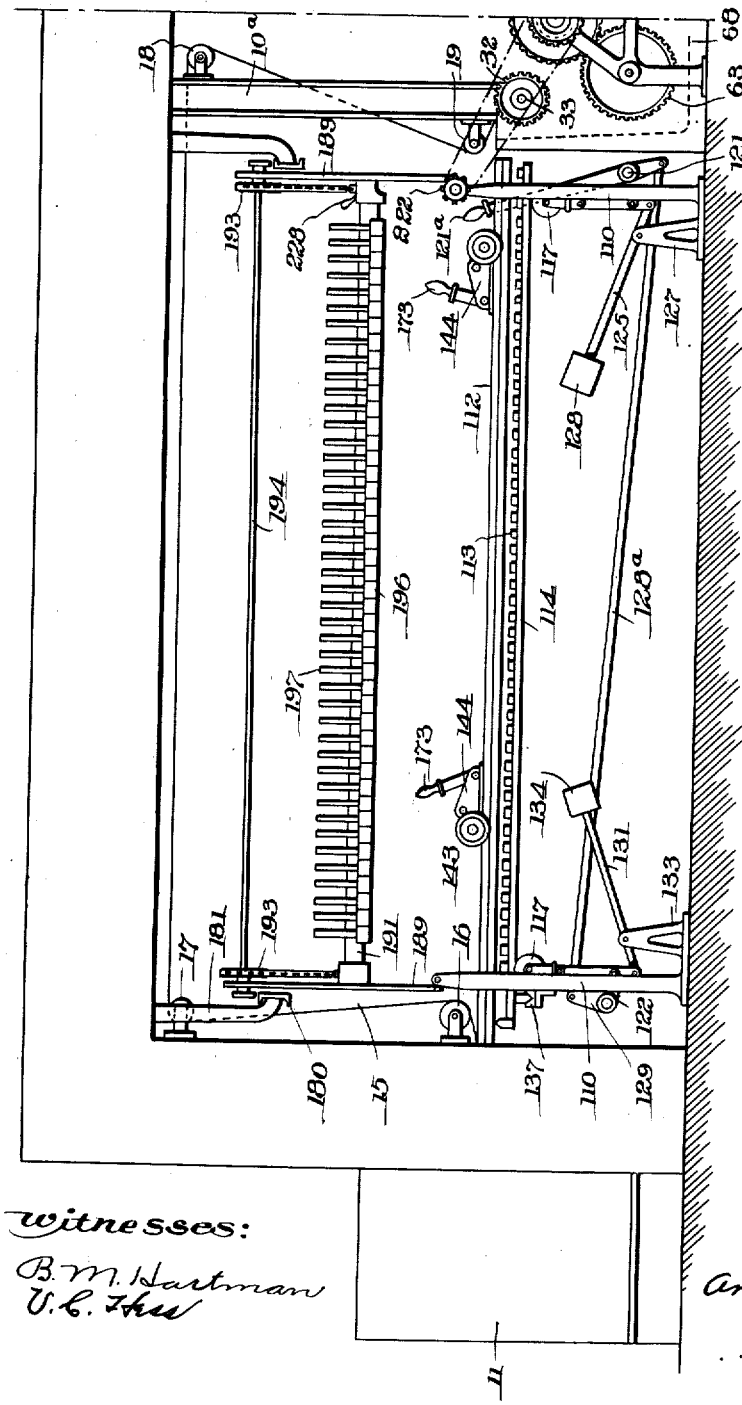

A. B. TOZER.
MACHINE FOR TREATING FABRICS.
APPLICATION FILED FEB. 10, 1908.
1,123,427.
Patented Jan. 5, 1915.
14 SHEETS—SHEET 2.
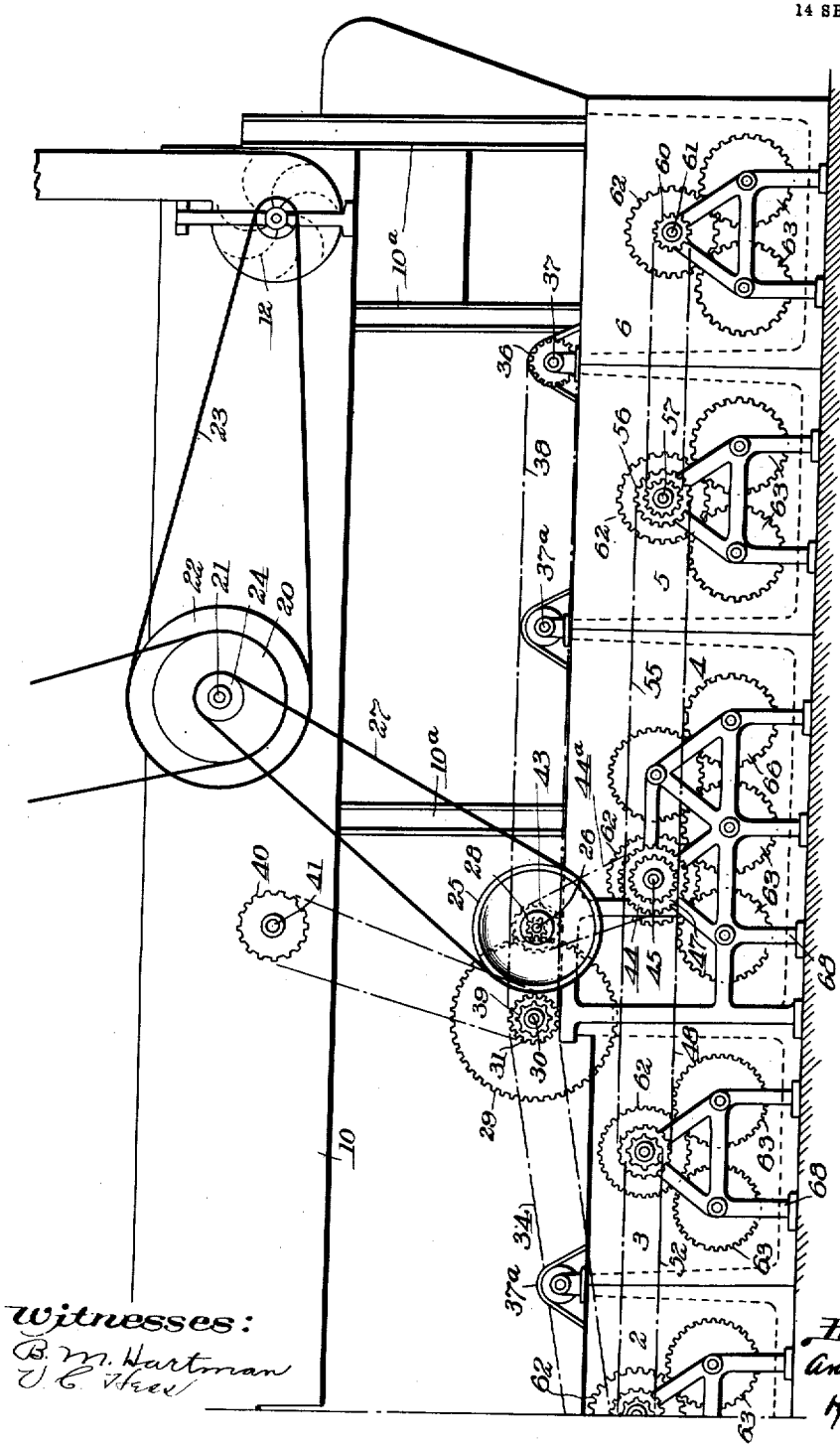
Fig. 1ª
Witnesses:
B. M. Hartman
J. C. Hess
Inventor
Archibald B. Tozer
by W. McCord
Atty.

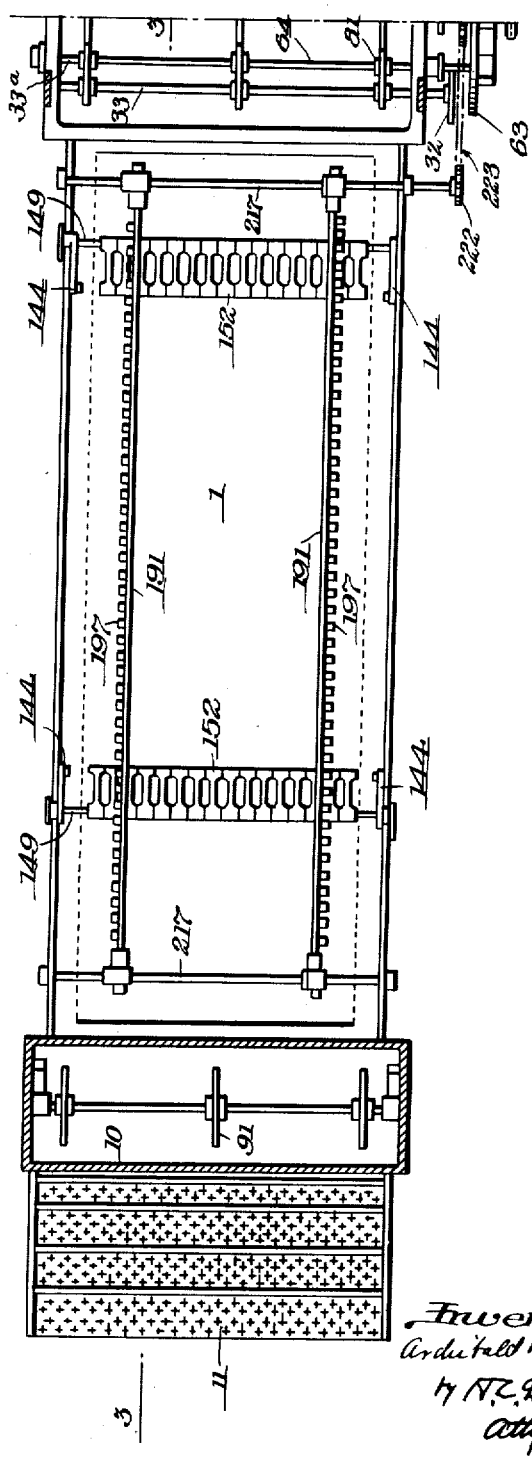

A. B. TOZER.
MACHINE FOR TREATING FABRICS.
APPLICATION FILED FEB. 10, 1908.

1,123,427.

Patented Jan. 5, 1915.
14 SHEETS—SHEET 4.

Witnesses
B. M. Hartman
O. C. Hill

Inventor
Archibald B. Tozer
by H. L. Lord
Atty.

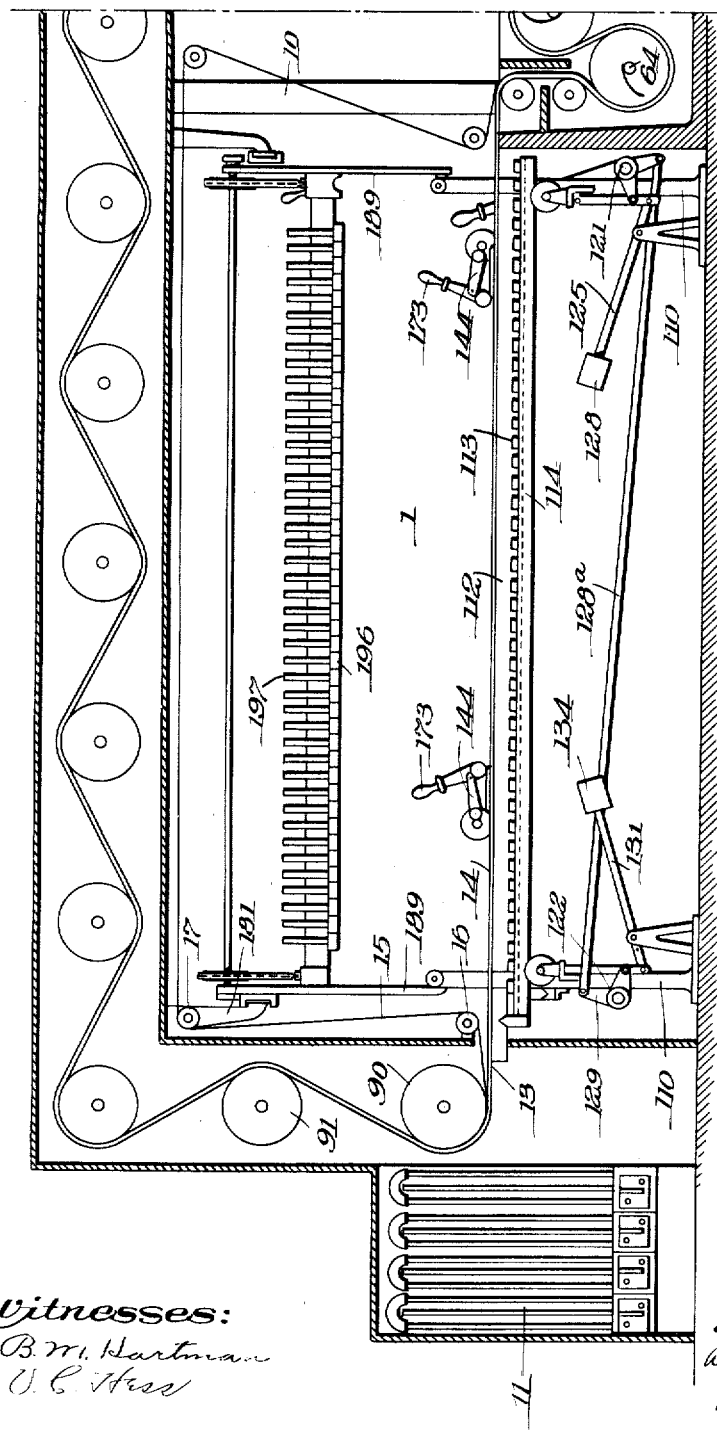

A. B. TOZER.
MACHINE FOR TREATING FABRICS.
APPLICATION FILED FEB. 10, 1908.
1,123,427.
Patented Jan. 5, 1915.
14 SHEETS—SHEET 6.
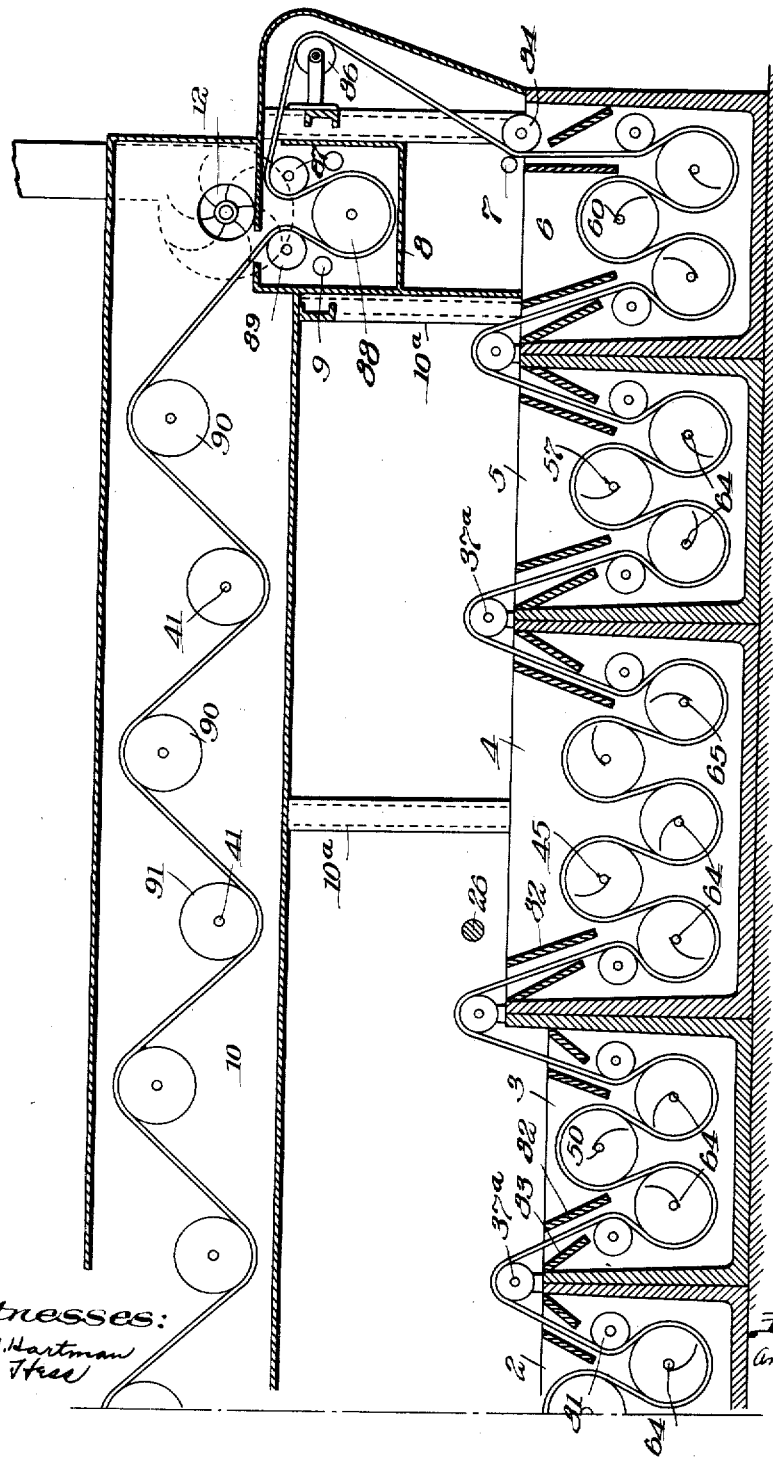
Fig. 3ª.
Witnesses:
B. M. Hartman
U. C. Free
Inventor:
Archibald B. Tozer
by H. L. Lord
Atty.

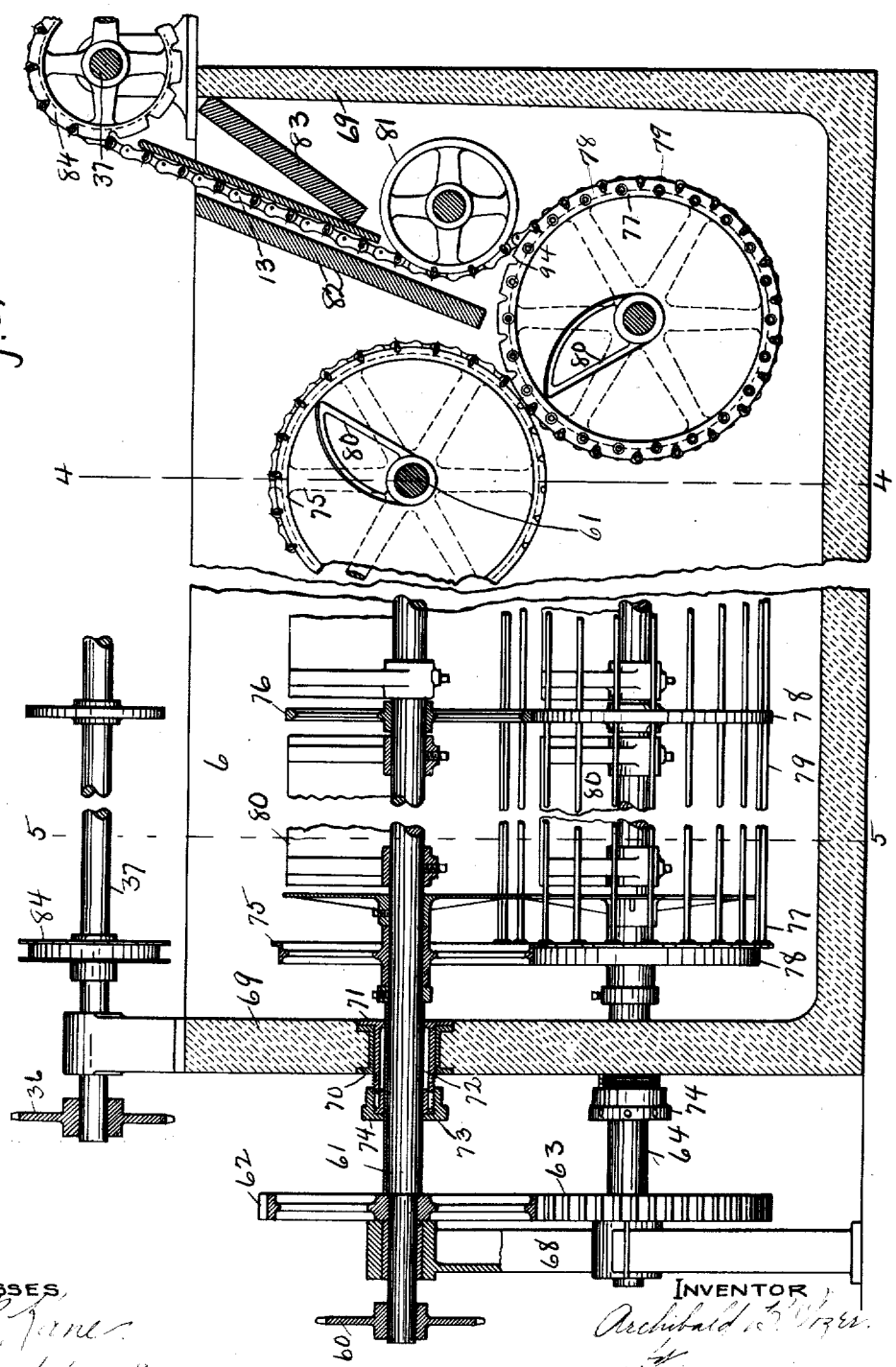
A. B. TOZER.
MACHINE FOR TREATING FABRICS.
APPLICATION FILED FEB. 10, 1908.
1,123,427.
Patented Jan. 5, 1915.
14 SHEETS—SHEET 7.

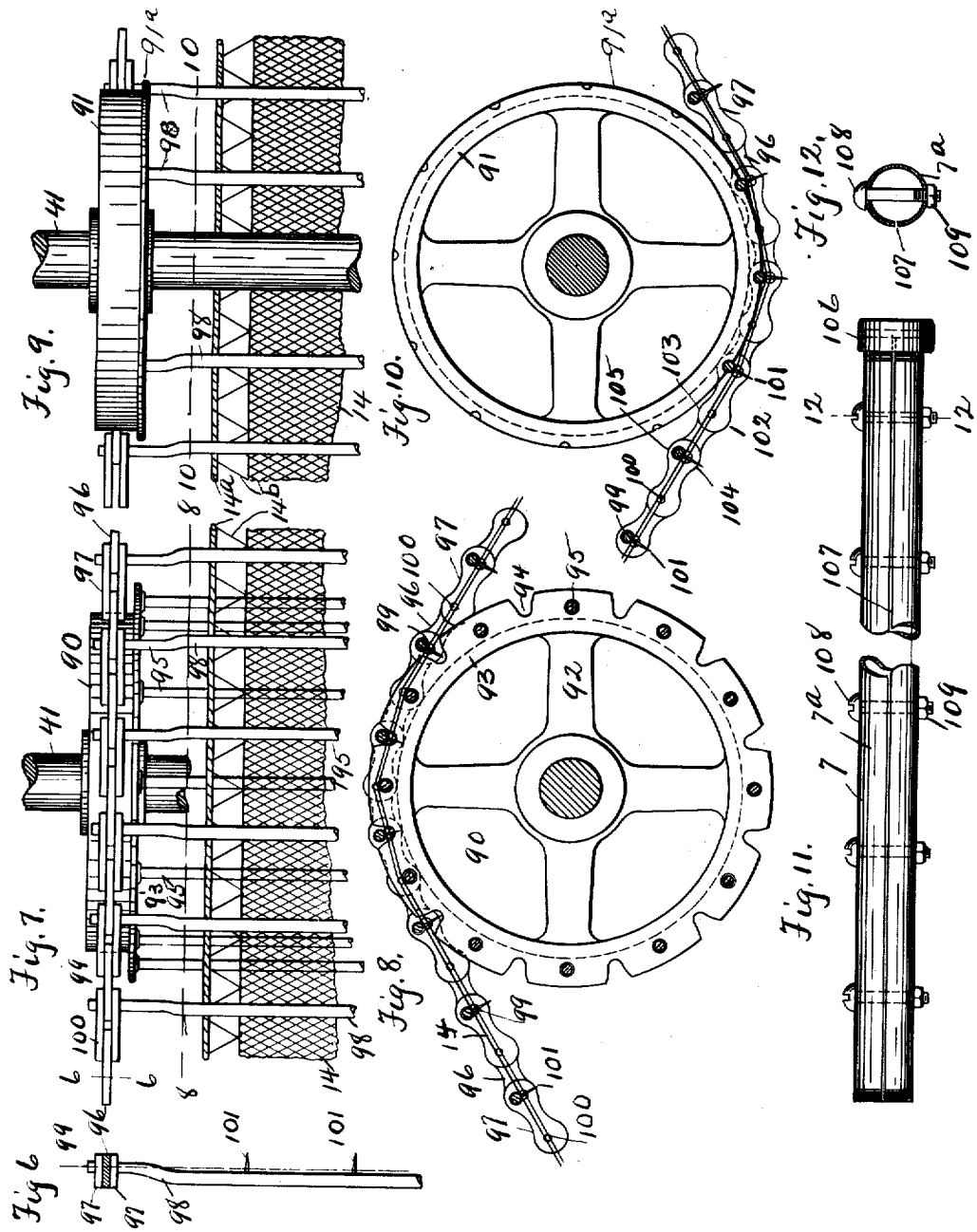

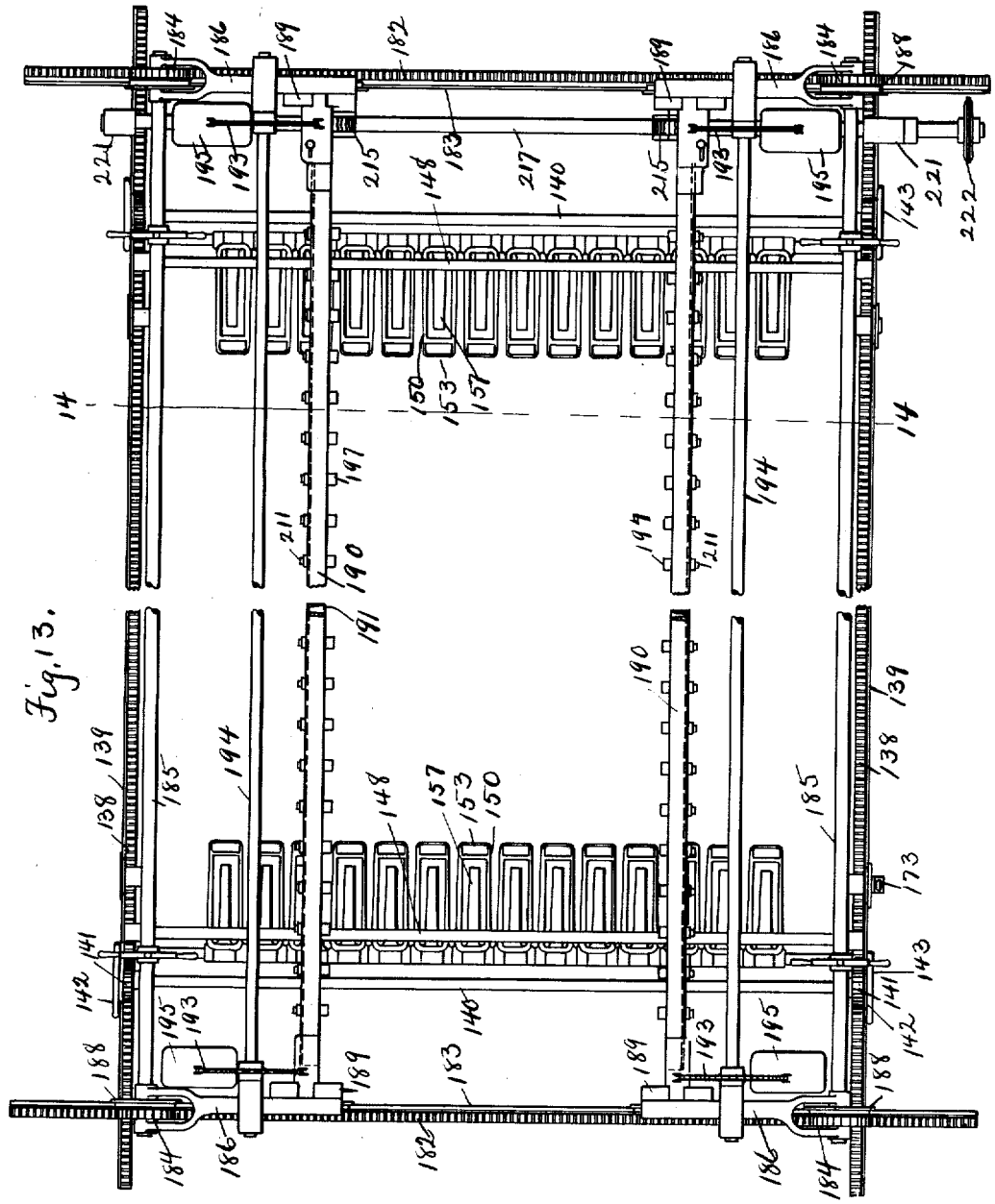

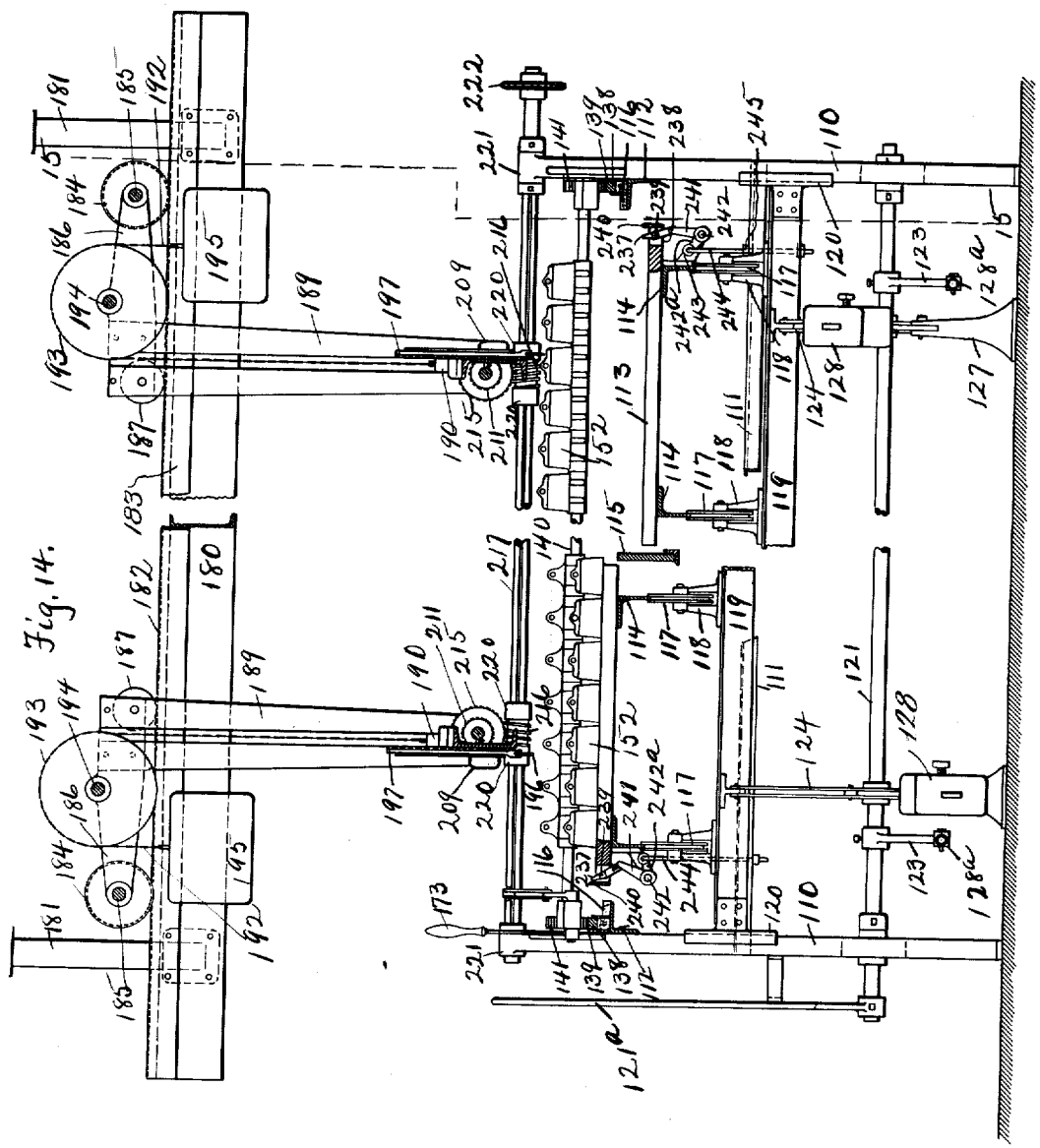

A. B. TOZER.
MACHINE FOR TREATING FABRICS.
APPLICATION FILED FEB. 10, 1908.
1,123,427.
Patented Jan. 5, 1915.
14 SHEETS—SHEET 11.
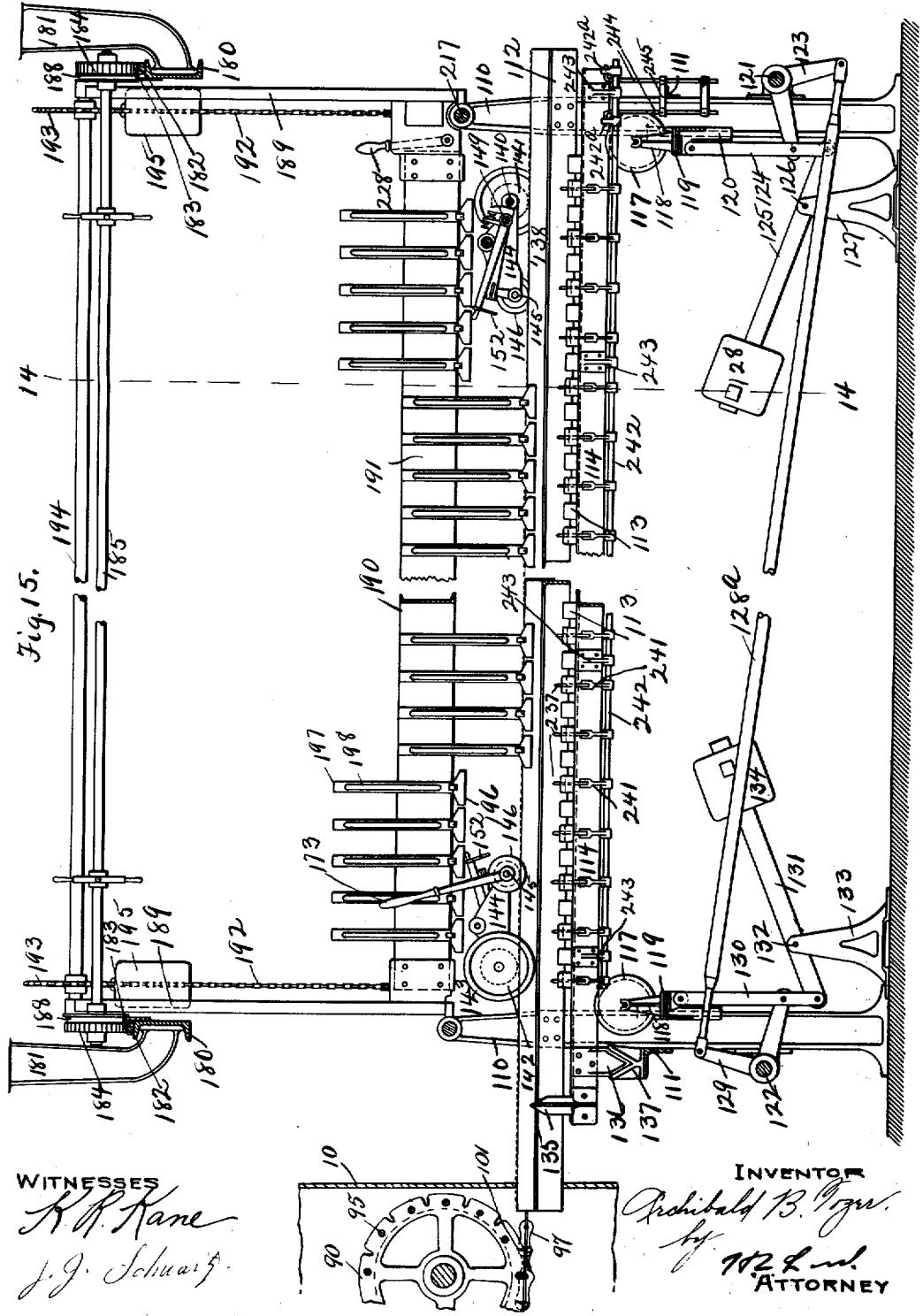
WITNESSES
K. R. Kane
J. J. Schwarz
INVENTOR
Archibald B. Tozer
by
W. L. ---
ATTORNEY

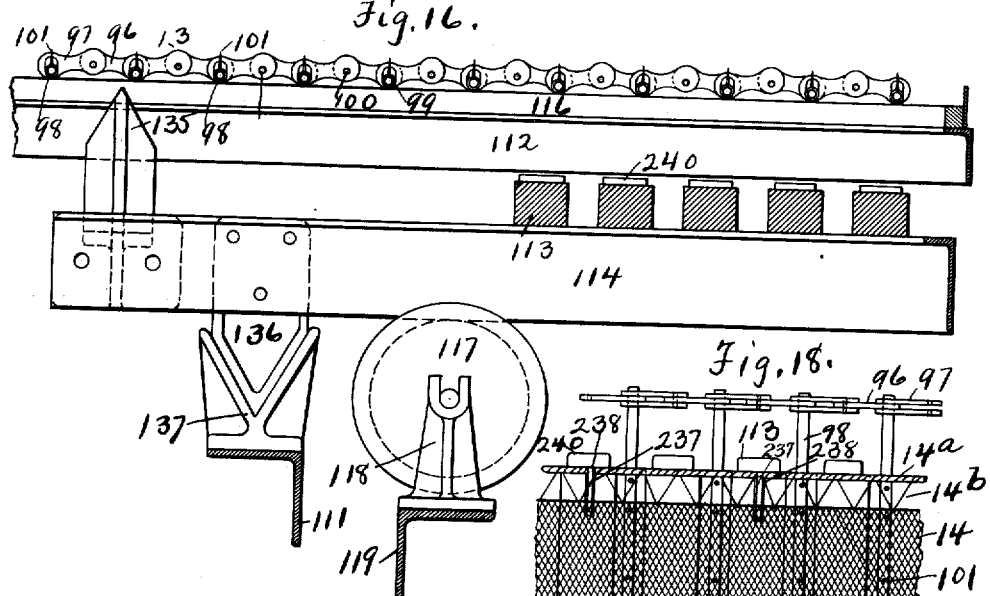
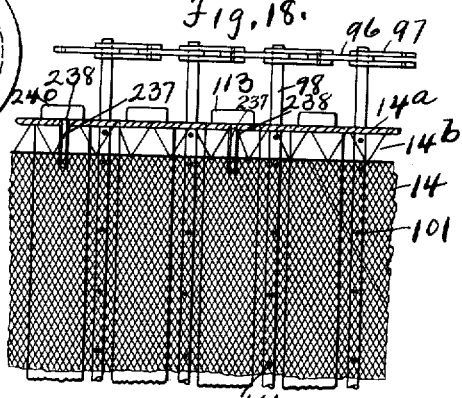
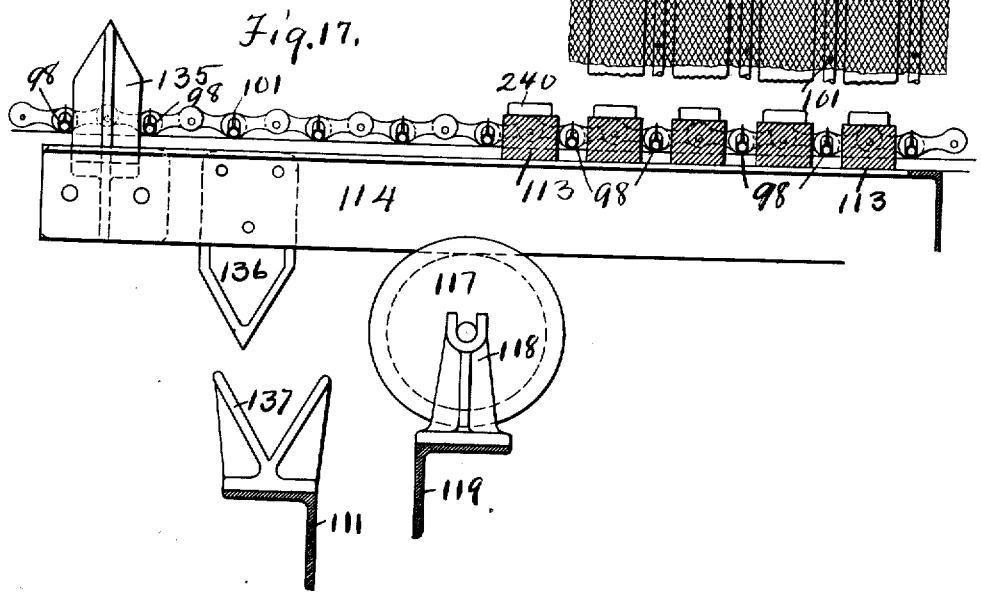

A. B. TOZER.
MACHINE FOR TREATING FABRICS.
APPLICATION FILED FEB. 10, 1908.

1,123,427.

Patented Jan. 5, 1915.
14 SHEETS—SHEET 13.

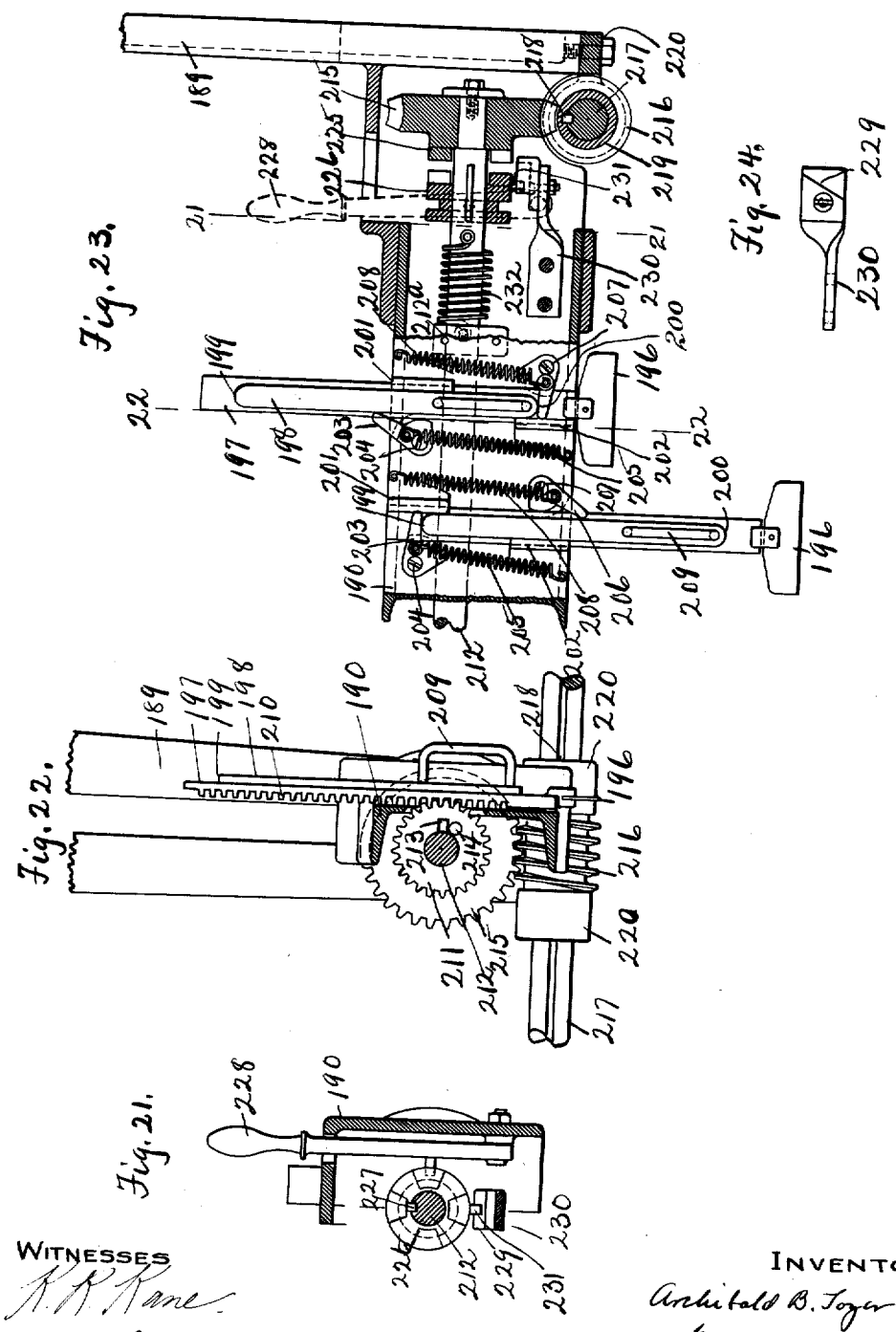

UNITED STATES PATENT OFFICE.

ARCHIBALD B. TOZER, OF CLEVELAND, OHIO, ASSIGNOR TO REED MANUFACTURING COMPANY, OF CLEVELAND, OHIO, A CORPORATION OF OHIO.

MACHINE FOR TREATING FABRICS.

1,123,427. Specification of Letters Patent. Patented Jan. 5, 1915.

Application filed February 10, 1908. Serial No. 415,032.

*To all whom it may concern:*

Be it known that I, ARCHIBALD B. TOZER, a citizen of the United States, residing at Cleveland, in the county of Cuyahoga and State of Ohio, have invented new and useful Improvements in Machines for Treating Fabrics, of which the following is a specification.

This invention relates to machines for treating fabrics, and consists in certain improvements in the construction thereof as will be hereinafter fully described and pointed out in the claims.

The machine is particularly designed for laundrying lace curtains. The preferred construction comprises instrumentalities for completely laundrying a curtain in a continuous operation, and with one handling. To accomplish this purpose a flexible carrier is provided on which the curtain is secured at least at the side edges and along its ends, and preferably throughout the body thereof at numerous adjacently arranged points. This carrier with the curtain so secured is then carried through a series of tubs or devices for cleansing. The curtain is then passed by an extractor for expelling the excess moisture. It is carried past the starching device, and again passes an extractor for expelling the excess starch. It is then carried through a drying chamber and returned to the operating table where the curtain may be removed and another curtain secured on the carrier and treated in a similar manner. Several features are desirable in connection with a machine of this character. The flexible carrier on which the fabric is arranged and secured at numerous adjacently arranged points should be so constructed and guided as to maintain constant distances between the points at which the fabric is secured along the line of the fabric, so that the fabric may not be strained. It is also desirable to supply a platform or table upon which the curtain or fabric may be brought to size and shape before being secured upon the carrier. A convenient means for securing the curtain upon the platform is by numerous clamps, the series of which may be adjusted so as to provide for different widths and lengths. In the preferred construction of the machine here shown, these clamps may be brought to clamping position individually, but can be lifted in series.

The present application is directed more particularly to those features of the mechanism which have to do with getting the fabric onto and off of the carrier, and with the means for driving and conducting the carrier, and with the specific construction of the carrier.

Figure 2A:
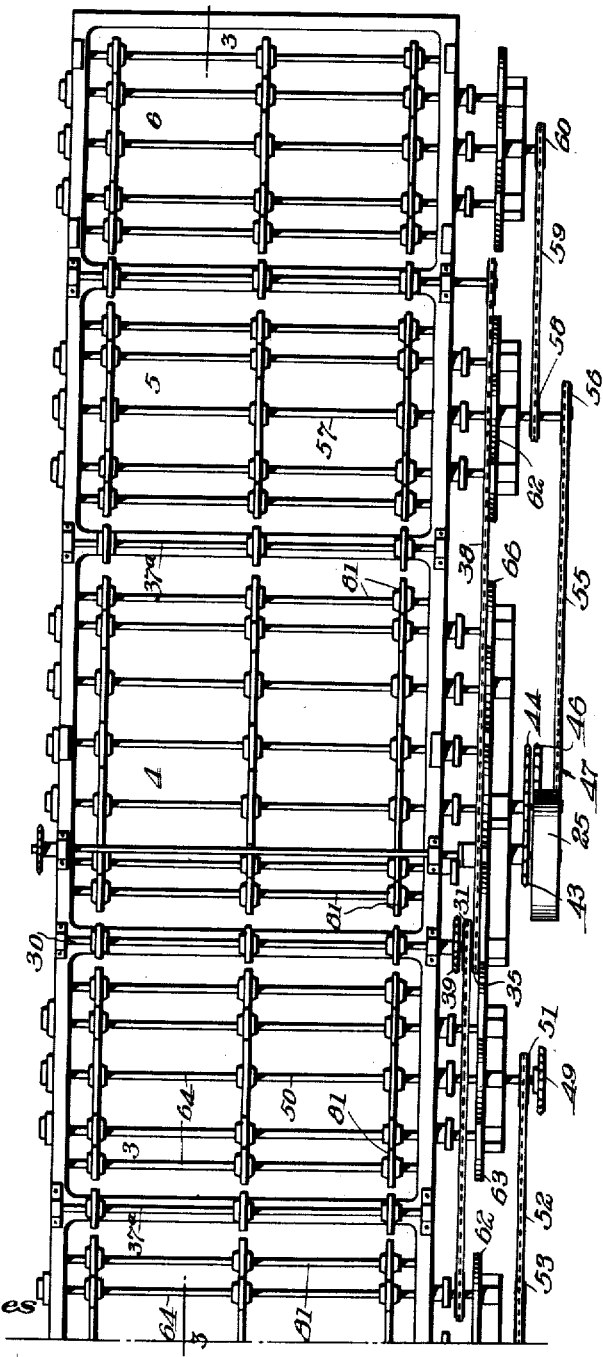
Figure 19:
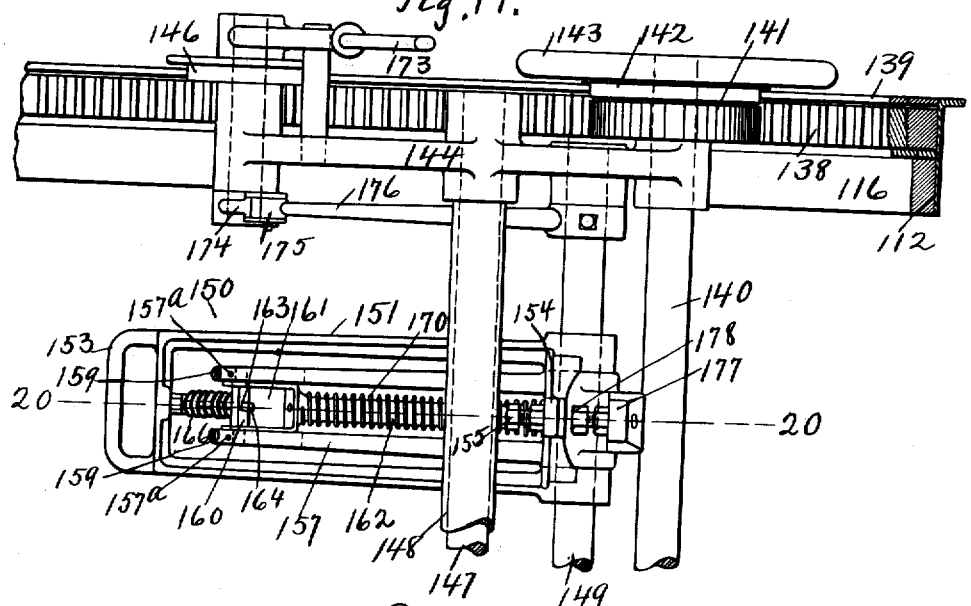
Figure 20:
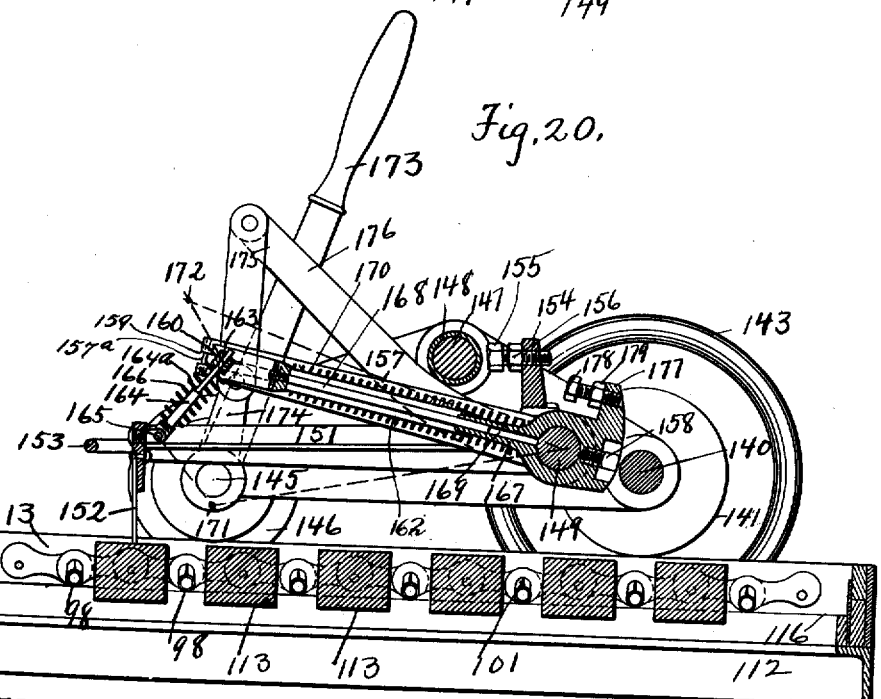

The invention is illustrated in the accompanying drawings as follows:

Figure 1 shows a side elevation of the front end of the machine containing the devices for arranging the fabric on the carrier. Fig. 1ª is a side elevation of the tubs and parts through which the carrier is led. Fig. 2 is a plan view of the mechanism below the dry chamber contained in Fig. 1. Fig. 2ª is a plan view of the mechanism below the dry chamber contained in Fig. 1ª. Fig. 3 is a vertical section on the line 3—3 in Fig. 2. Fig. 3ª is a vertical section on the line 3ª—3ª in Fig. 2ª. Fig. 4 is a section on the line 4—4 in Fig. 5, and shows an enlarged view of a tub. Fig. 5 is a section on the line 5—5 in Fig. 4. Fig. 6 is a section on the line 6—6 in Fig. 7. Fig. 7 is a plan view of a fragment of the carrier and drum for conducting the carrier. Fig. 8 is a view partly in section on the line 8—8 in Fig. 7. Fig. 9 a plan view of a carrier and conducting wheels. Fig. 10 is a view partly in section on the line 10—10 in Fig. 9. Fig. 11 is an elevation of the extractor nozzle. Fig. 12 a section on the line 12—12 in Fig. 11. Fig. 13 is a plan view of the operating table, and the clamp mechanism. Fig. 14 is a section on the lines 14 in Figs. 13 and 15. Fig. 15 is a section on the line 15 in Fig. 14. Fig. 16 is a longitudinal section of a fragment of the table showing the table in its lower position. Fig. 17 a similar view with the table elevated. Fig. 18 is a plan view of a fragment of the carrier and table. Fig. 19 is a plan view of a fragment of the end clamp mechanism. Fig. 20 a section on the line 20—20 in Fig. 19. Fig. 21 is a section on the line 21—21 in Fig. 23. Fig. 22 a section on the line 22—22 in Fig. 23. Fig. 23 an elevation of the side clamps partly in section to better show the construction. Fig. 24 a plan view of the lock out cam for the side clamp clutch.

1 marks the operating table. In the operation of the machine the curtain is arranged on the carrier and removed from the machine at this operating table. The carrier passes through the series of tubs 2, 3, 4, 5 and 6, which may be variously utilized, as for instance, for washing, rinsing, or dyeing. The carrier then passes the extractor 7, then to the starch vat 8, then past a second extractor 9, then through the drying chamber 10. The drying chamber is preferably arranged over the tubs and operating table, and down along the side of the operating table, so that as great a length of drying chamber may be had as possible. 11 marks the heating apparatus for supplying heated air to the drying chamber. A fan 12 arranged at the opposite end of the chamber from the heating apparatus assures the proper movement of the air. The carrier 13 is conducted through and past these several instrumentalities. A supporting web 14 ordinarily formed of an open fabric is carried by the carrier, and in effect forms a part of it. A second web or net 15 runs over the curtain or fabric being treated. It is of course necessary, that the net or web 15 should be led off of the curtain at the operating table, so that a curtain may be removed or placed upon the carrier. To effect this the guide pulleys 16, 17, 18 and 19 are provided over which the net or web 15 is led. This leaves the curtain or other fabric being treated exposed at the operating table.

The machine is driven from the pulley 20 (see Fig. 1), which is mounted on a shaft 21. The fan 12 is driven from a pulley 22 on the shaft 21, by means of a belt 23. Pulley 24 is also fixed on the shaft 21 and drives the pulley 25 by means of the belt 27. The pulley 25 is mounted on the shaft 26. A gear 28 is fixed on the shaft 26 and meshes with and drives a gear 29 fixed on the shaft 30. A sprocket wheel 31 is mounted on the shaft 30 and drives a sprocket 32 by means of chain 34. The sprocket 32 is mounted on the shaft 33 and this shaft has the sprocket driving wheels 33ª over which the carrier is led. A second sprocket 35 (see Fig. 2) is fixed on the shaft 30 and drives the sprocket 36 by means of the chain 38. The sprocket 36 is mounted on the shaft 37 which carries the wheels 84 (see Figs. 4 and 5). A sprocket 39 is also fixed on the shaft 30, and drives a sprocket 40 on one of the shafts 41. Said shaft 41 carries one set of wheels 91 in the drying chamber, and forms another point of drive for the carrier. In this way the carrier is driven at different points, and thus somewhat relieved of strain. In order to effect the desired result it is not only necessary to drive the carrier through the various tubs, but is also necessary to agitate the liquids in the tubs. The drive mechanism is connected up for that purpose as follows: A sprocket 43 is fixed on the shaft 26 and drives a sprocket 44 fixed on the shaft 45 by means of the chain 44ª. A sprocket wheel 46 is also fixed on the shaft 45 and drives through a chain 48, a sprocket 49 fixed on the shaft 50. A second sprocket 51 is fixed on the shaft 50 and drives through a chain 52, a sprocket 53 on the shaft 54. A sprocket 47 is also fixed on the shaft 45 and drives through the chain 55, a sprocket 56 fixed on the shaft 57. A sprocket 58 is also fixed on this shaft. The sprocket 58 drives a sprocket 60 through a chain 59. The sprocket 60 is fixed on the shaft 61. The shafts 54, 50, 45, 57 and 61 are arranged in the tubs 2, 3, 4, 5 and 6 respectively, and form the primary driving element for the agitating mechanism in each of these tubs. The agitating mechanism in each tub is practically the same, with the exception that in tub 4 there are two more agitating wheels than in the other tubs. The shafts mentioned are provided with the gears 62 and the gears 62, each mesh with two other gears 63. The gears 63 are mounted on the shafts 64. In tub 4 there are two extra shafts 65 on which are arranged the gears 66, so that these shafts are driven from one of the gears 63. These shafts for the tubs are all carried in frames 68 arranged outside of the tubs. All that is necessary for these frames is that they extend to proper position to carry the shafts.

Figs. 4 and 5 are enlarged views showing details of the tub 6. All the tubs are, however, as to their general features the same. The tubs are preferably formed of concrete walls 69. These have the journal openings formed in them by means of a metal sleeve 70. The bearing 71 is arranged in this sleeve. A stuffing box 72 is formed in the bearing. A gland 73 operates in the stuffing box, and the nut 74 is screwed onto the bearing 71 to force the gland into the stuffing box.

The wheels 75 are arranged at each side of the tub on the shaft 61. These wheels are journaled on the shaft. Wheel 76 is centrally located on the shaft, and forms an additional support for the carrier. The carrier in moving over the wheels 75 operates in the same manner as with relation to the wheels shown in Figs. 9 and 10, that is with relation to these wheels the points on the carrier which secure the fabric extend outwardly as will be hereinafter more fully explained. Arranged on the shaft 64 is a drum 77. This drum is made up of wheels 78, and the connecting bars 79. The drum is in its general construction similar to that shown in Figs. 7 and 8, in which the points on the carrier extend toward the center of the drum as will be hereinafter more fully explained. On each of the shafts there are arranged agitating blades 80, and as the wheels 75 and the drum 77 are journaled on the shafts 61 and 64, it is evident, that these agitating blades may be rotated continuously as may be required in the operation of the machine. These agitating blades should be so arranged with relation to each other, as to give the most efficient pulsations to the movement of the water, that is to effect a movement backward and forward through the fabric as it passes through the tubs.

In each tub there are adjacent to the drums 77, guide wheels 81 over which the carrier is led. The purpose of these guide wheels is to prevent the extension of any considerable lengths of the carrier in a straight line, especially where the fabric on the carrier is subjected to a violent action of the agitated liquid.

The carrier passes into and out of each tub between the guard boards 82 and 83. The purpose of these boards is to prevent a violent movement of the liquid against that portion of the carrier which is substantially in a straight line, so as to prevent the disarrangement of the fabric upon the carrier.

Wheels 84 are provided above the partitions between the tubs and support the carrier as it passes over the partitions from tub to tub. The wheels 84 are supported by the shafts 37 and 37ª, the shafts 37ª running idle and the shaft 37 being driven by the sprocket 36.

The carrier in passing from tub 6 is carried by the wheels and drums 84, 86 and 87, it being understood that in each instance where the supporting pins of the carrier extend inwardly a drum must be used similar to the drum 77 as shown in Fig. 5, or 92 shown in Fig. 8, and is led into the starching tank 8. Here it passes around the wheels 88 and is saturated with starch and passes the extractor 9. It is then led over the drum 89, and then alternately passes the drums 90 and wheels 91 through the drying chamber 10 back to the operating table.

The carrier, drums and wheels are shown in detail in Figs. 6, 7, 8, 9 and 10. The carrier is formed with two chains, one at each side and carrier bars extending from one chain to the other at close intervals. Where the carrier is turned, so that the points extend inwardly it runs on a drum, and where the points extend outwardly it runs on wheels. These conditions are illustrated in Figs. 7 and 8 as to the drum, and Figs. 9 and 10 as to the wheels. The drum is formed by means of the wheels 92. These are provided with the rims 93 in which are arranged the notches 94. These notches are nicely distanced with relation to the chain. Hollow rods 95 extend from one wheel 92 to a wheel at the opposite side of the drum. The rods 95 are midway between the notches 94. The wheels 91 are provided with the flanges 91ª to guide the chain, and arranged to permit the smooth running of the chain over them. In this instance the bars of the carrier support the fabric, so that cross rods similar to 95 are not required.

It is necessary to maintain the distance between the points at which the fabric is secured constant, so that the fabric will not be strained. The chains are formed of the links 96 and 97. The links 97 are preferably in pairs, and extend each side of the links 96. The carrier bars 98 are fixed in the links 96 and form the pivotal joints for the links at 99, and the links are pivoted midway between the rods at 100 to links 96. The bars are bent or deflected as shown in Fig. 6, so that the side of the bar on which the fabric is supported is slightly below the axis of the joint 99. The intention is to have the axis of the joint exactly on the line of the fabric, and inasmuch as the web or net is arranged below the fabric the line of the joint is sufficiently above the top surface of the bar to allow for the thickness of this net, or supporting web. Each of these bars is provided with a series of pins 101 arranged in close proximity, and inasmuch as these rods are close together these pins are arranged in close proximity to each other throughout the surface of the carrier. The links of the chain at the sides of the chain pivots have their surfaces arranged at a distance from the axis of the pivot to operate on the wheels and drums in a manner to maintain constant distances between the points on the carrier as the carrier passes over the wheels and drums. At the joints 100, the sides 103 of the links (see Fig. 10) that is, the sides opposite the pins are cut away and the sides 102 which are opposite the sides 103 are enlarged. Thus when the link passes over the curved drum as indicated in Fig. 10, the surfaces 103 do not force the axis of the joints 100 out of alinement with the axis of joints 99 as clearly shown in Fig. 10. Preferably the surfaces 103 are sufficiently cut away so that with the surface of the links opposite the joint 99 in contact with the drum, the surfaces 103 will just contact the drum with the axes of the several joints in line. To accomplish this, the surfaces 105 of the links at the joints 99 which are opposite the pins 101 are a greater distance from the axes of the joints than the sides 104 in the direction of the pins. When, therefore, the carrier is carried over a drum with pins on the inside as shown in Fig. 8, the surfaces 102 contact the drum and the sides 104 are cut away sufficiently to permit the axis of the joint 99 remaining exactly in alinement with the joints 100 as clearly shown in Fig. 8. The enlargements 102 and 105 are so proportioned as to bring the axes of the pivots just above the surfaces of the rods 95, the distance above the surface of the rod 95 being the thickness of the net or web 14 so that the effective axis of the carrier as it passes over the drums is in the plane of the fabric itself. The fabric, therefore, extends in a straight line from rod 95 to rod 95 and the distance between the pins 101 on the different rods along the line of the fabric remains constant whether the carrier is on the drums or in a straight position.

The extractor 7 is formed of a tube or pipe 7ª provided with a slit 107 extending longitudinally from end to end. One end is closed by a cap 106. Bolts 108 extend through the pipe at intervals, and nuts 109 are screwed onto the bolts. The slit 107 is initially slightly wider than is desired, so that by tightening or loosening the nuts 109, the slit may be made wider or narrower to give the desired nozzle, and the nozzle so formed is directed upon the fabric as it comes from the last tub. The extractor 7 is connected with any source or supply of dry steam (not shown) and this as it is expelled through the nozzle passes through the fabric and drives out the surplus moisture. The moisture is carried back into the tub. The extractor 9 is of the same construction. It operates in the same manner to expel the surplus starch.

The drying chamber is supported by any suitable frame. As shown in Figs. 1 and 3 uprights 10ª form a part of this frame. The table is supported by posts 110. These posts are connected by cross beams 111 which extend crosswise of the machine from post to post, and by the side beams 112 which extend lengthwise from post to post at the sides of the machine. The table is made up of a series of strips 113 which extend crosswise of the machine, and are supported and bound together by the beams 114 extending lengthwise of the machine. These strips are spaced to register between the cross bars of the carrier, so that when the table is lifted they will pass between the bars. The strips are of sufficient thickness to carry the upper surfaces of the strips above the points of the pins. In this way the surface of the table is free from the pins, so that the fabric may be laid upon it and stretched and shaped. The table is then again lowered, so as to permit the further movement of the carrier, and the operation repeated. The strips 113 are broken at the middle to permit of the placing of a supporting bar 115. This bar extends lengthwise of the machine, and is intended to support the centers of the bars of the carrier when in the space occupied by the table. The carrier is supported at the sides by the guide ways 116. The beams 114 rest in the grooved wheels 117. These wheels are carried by brackets 118, and the brackets 118 are mounted on the slide cross beams 119. These cross beams are provided with brackets 120 at their ends which are designed to slidingly engage the posts 110, so as to guide the beams 119. The rock shafts 121 and 122 extend crosswise of the machine one at each end of the table at posts 110. The levers 123 are fixed on the shaft 121, said levers being arranged in an angle forming in effect bell crank levers. Links 124 extend from one of the levers to the beam 119 at the front end of the table. Levers 125 are also secured to the links and are pivotally mounted at 126 on the posts 127. They have the adjustable weights 128 arranged on the levers and so positioned as to nicely balance the weight of one end of the table. Bell crank levers 129 are fixed on the shaft 122 at the opposite end of the machine, and the rod 128ª connects one arm of the bell crank lever 129 with the bell crank lever 123, so that these bell crank levers are thus compelled to work together. The purpose of this is to keep the table horizontal. The bell crank levers 129 are connected by the links 130 with the sliding beam 119 at the rear end of the table, and levers 131 are pivotally mounted at 132 on the posts 133. The adjustable weights 134 are provided for the same purpose as the adjustable weights 129.

It will be noted that it is necessary to bring the strips 113 to a position where they will register with the spaces between the bars. As this may vary, some means must be provided for bringing the strips 113 into register with the spaces. It will be noted that the strips are carried by the beams 114, and that these beams are mounted on the wheels 117. This allows the table to move freely lengthwise. The elevated and lower positions of the table are clearly shown in Figs. 16 and 17. A V-shaped cam 135 extends upwardly from the table so that as the table is raised, this V shaped cam is thrust between two of the rods 98 and thus positions the table lengthwise so that the strips 113 come into register with the spaces between the rods 98. To return the table to the same position each time it is lowered, a V shaped cam 136 projects from the bottom of the table and enters a V shaped socket 137 upon the cross beam 111. This returns the table each time it is lowered to the same position. In this way, the table is kept in the same general position in the frame.

It is desirable to provide means whereby the fabric may be shaped and clamped in position on the table, so that as the pins enter it it will be of the proper length and shape. To accomplish this, end clamps are necessary as well as side clamps, and inasmuch as it is desirable to operate upon different sizes of the fabric these are preferable adjustable both as to length and width. It is also desirable to have these clamps arranged in series, so that they may be thrown into action individually. The speed of the machine can be increased by being able to throw these clamps out of action together, and in my preferred construction I provide means for this purpose.

Racks 138 are arranged on the rails 112 and extend the full length of the table. A track 139 is arranged adjacent to each rack. Shafts 140 extend across the machine from rack to rack, and the pinions 141 are fixed on these shafts. This forms a well known paralleling mechanism keeping the shafts 140 square with the table. Wheels 142 are also fixed on the shafts 140, and run on the tracks 139, and hand wheels 143 are provided by which the shafts may be turned, so as to more readily move the mechanism over the table. It will be understood that there is preferably one of the shafts 140 at each end of the table, and at each side there is practically a duplicate frame 144. The shaft 145 extends through this frame nearer the center of the machine than the shaft 140. A wheel 146 is journaled on the shaft 145 in position to travel on the track 139. A rod 147 extends from one frame 144 to a similar frame at the opposite side of the machine. A sleeve 148 forms a distance piece on the rod 147. A rod 149 extends from one frame 144 to the opposite frame, and is journaled in these frames. The end clamps 150 are carried by this rod. Clamp levers 151 are journaled on the rod 149. The clamp feet 152 are secured to the ends of these levers, and each lever is provided with a handle 153 by means of which it may be grasped and lowered when desired. A yoke 154 extends across from one base of the lever to the opposite base, and the set screw 155 is screwed into this yoke and locked in adjustment by a jam nut 156. This screw is so positioned as to come in contact with the sleeve 148, and thus limits the downward movement of the lever 151. It is desirable, of course, to have these clamps follow the table in its downward movement until the fabric has been engaged by the pins, and this adjustment is designed to permit of this following action of the clamp to a sufficient extent, but to limit the downward movement.

A clamp operating lever 157 is fixed on the shaft 149 and is arranged between the ends of the lever 151. The outer end of the lever 157, that is, the clamp end is open vertically and the arms thus formed in the lever 157 have the horizontal slots 159. The cross head 160 is arranged in the open end of the lever 157. The ends of this cross head are in the form of trunnions which are slidingly and rotatively mounted in the slots 159. These trunnions also extend through the U-shaped yoke 161 This yoke is secured to the spring actuated rod 162. The cross head has the perforation 163 through which extends the pin 164, the pin being free to slide through the perforation. The pin is pivoted at 165 on the lever 151. The spring 166 is tensioned between the cross head 160 and the shoulder on the end of this pin. The spring actuated rod 162 is in the form of a tube and extends over the sleeve 167 projecting forwardly from the closed end of the lever 157. A rod 168 extends from the U-shaped yoke 161 into the opening 169 in the sleeve 167 so that the spring actuated rod is telescopically mounted on the lever 157. A spring 170 is tensioned between the yoke 161 and the base of the lever 157. Stops 157ª extend across the slots 159 so as to limit the outward movement of the cross head 160. With the parts in the position shown in Fig. 20, it will be readily observed that the lever 151 may be raised and lowered simply by the pin 164 sliding through the perforation 163, and that the tension of the spring 166 gives a clamping action to the clamp. The pin 164 has a shoulder 164ª which engages the cross head and forces the same toward the rear against the tension of the spring 170. By this mechanism a sliding base is provided for the spring 166, the base sliding outwardly on the lever so as to be more nearly directly above the clamp when the clamp is in its clamping position. At the same time, the spring 166 and rod 164 may be given sufficient length to give the desired flexibility up and down to the clamp. In the upper position of the clamps all of them have the levers 157 in the position shown in Fig. 20, but the position of the levers 151 is indicated by the upper dash line terminating at the point 172, the pivot being at the point 172, and the tendency of the spring 166 is then to hold lever 151 in its upper position. As the lever 151 is pulled down the pin 164 is brought into alinement with the lever 157, and at this point the spring action is neutralized. As the lever 151 is moved farther down the spring becomes active in forcing it downwardly, so as to effect a clamping action.

In order to raise all the clamps together, the following mechanism is provided: An operating lever 173 is fixed on the shaft 145. An arm 174 is fixed on the opposite end of this shaft and is connected by a link 175 with an arm 176. The arm 176 is fixed on the shaft 149. By throwing the lever 173 to the left from the position shown in Fig. 20 the arm 174 is swung down carrying with it the link and arm 176. This rocks the rod 149 and carries the lever 157 downwardly to the position indicated by the dash line ending at the point 171 indicating the axis of the trunnion on the cross head at the extremity of the downward movement. This movement of the lever 157 brings the trunnion 160 which acts as the base of the spring 166 below a line including the axis of the rod 149 and the axis of the pin 165 and this will reverse the action of the springs, so that the springs 166 will tend to push the levers 151 upwardly, and as the lever 173 is returned to its normal position, the rod 149 is rocked, so as to carry the lever 157 to the position shown in Fig. 20, and with it all of the clamps to a position bringing the pivots 165 at the point 172.

It will be noted that after the levers 157 pass a point in line to bring the cross heads in line with the pivots 165 and the axis of the rod 149, the levers 157 are under pressure exerted in a downward direction. To limit this movement a lug 177 is arranged at the base of the lever, and a set screw 178 is screwed into this lug in position to contact the yoke 154, and thus limit this movement. The screw 178 may be locked in adjustment by the nut 179. In this mechanism, therefore, the series of clamps 150 are normally held in their upper position; a carriage is provided for them with paralleling mechanism, so that all the clamps may be moved lengthwise of the table to accommodate longer or shorter pieces of the fabric; the clamps may be pulled down to the clamping position individually; and all of the clamps may be elevated with the single stroke of the operating lever 173. The side clamps are carried by the cross beams 180, and these are supported by the hangers 181 secured to the under side of the heating chamber. A rack 182 is carried by each beam 180, and track 183 is arranged adjacent the rack. The pinions 184 mesh with the racks 182 and shafts 185 connect the pinions on the opposite racks, thus forming a paralleling device for the clamp carrier. The clamp carrier comprises the frames 186, in which the rods 185 are journaled. Each frame is provided with a wheel 187 at its inner end which is adapted to travel upon the track 183, and each frame is also provided with a wheel 188 journaled upon the shaft 185 and adapted to travel upon the track 183. The legs 189 extend downwardly from the frames 186, and the clamp beams 190 extend lengthwise across the table from leg to leg. The series of clamps are carried by these beams 190. These beams are slidingly mounted on the legs, and each end of each beam is supported by a chain 192. The chain extends over a sprocket wheel 193 fixed on a shaft 194. There are 4 of these chains one at each end of each beam, and sprocket wheels for the chains supporting the same beams are connected by the same shaft 194, so that a paralleling device is thus formed. Weights 195 are secured to the free ends of the chain, and are so proportioned as to balance the clamp beams 190, and the parts carried thereby so that the beams may be easily lifted to give the operator free access to the table for securing the ends of the fabric. The beam can then be drawn down, and the side clamps arranged. It will be noted by means of the traveling frames and their carrying devices, the beams may be pushed in or out as desired to adjust the line of the clamps to different widths of fabric.

The details of the side clamps are more fully shown in Figs. 21 to 24. Each clamp is provided with a foot 196 which is arranged on a slide 197. Each slide is provided with a finger guide 198 with a rounded end 199 at the top, and a rounded end 200 at the bottom. The slides are secured to the beam 190 by the guide plates 201 and 202 which extend over the slide at the edges of the finger guides 198. A clamp finger 203 is pivotally mounted on the beam by the screw 204. The end of the finger is adapted to slide along the edge of the finger guide 198 until the end 199 is reached. The finger then swings over the rounded end and under the influence of the spring 205 forces the slide, and with it the foot 196 downwardly, thus producing the clamping effect desired. The slide is held in its upper position by a similar finger 206 which is adapted to slide along the guide 198. It is pivotally mounted by means of a screw 207 upon the beam 190, and is adapted to swing under the influence of a spring 208, under the rounded end 200 to yieldingly hold the slide in its upper position. Each slide is provided with a handle 209 so that each slide may be pulled down separately, and the finger 203 has sufficient movement to follow the table sufficiently to assure the engagement of the pins before the clamping action ceases. It will be seen, therefore, that the side clamp beam may be drawn down, the beam moved in or out as required, and the clamps drawn down individually into clamping position. With these clamps as well as with end clamps it is desirable to return them all together. Each slide 197 has at its rear a rack 210 which meshes with a pinion 211, the pinion extending through the side of the beam 190. The pinion is journaled on a shaft 212 which extends lengthwise of the beam, and is carried in bearings 212ª. A pin 213 is arranged in the shaft at the side of each pinion 211, and each pinion has a pin 214 in position to engage the pin 213, so that each pinion is free to move practically one revolution. This movement is sufficient to permit of the throwing down of the slide 197 without bringing the pin 214 into engagement with the pin 213 on the shaft. A worm gear 215 is journaled on the end of the shaft 212, and when the beam 190 is in its lower position it is brought into mesh with a worm 216. The worm 216 is slidingly mounted on a shaft 217 and is locked against rotative movement by spline and groove mechanism 218. The shaft is provided with the sleeves 219 which form a bearing for the shaft, and the worm is locked to move with the leg 189 by a bearing yoke 220, which extends each side of the worm. Through this mechanism the worm is moved in and out on the shaft with the clamping beam 190. The sprocket 222 is fixed on the end of the shaft 217 and is driven from a sprocket 224 on the shaft 53 by a chain 223. (See Fig. 1). The worm 216 rotates, therefore continuously. A clutch is provided for locking the worm with the shaft 212. This clutch is formed by the detents 225 on the worm wheel engaging the clutch block 226 slidingly mounted on the shaft, but locked against rotative movement thereon by the spline and groove mechanism 227. A lever 228 is pivotally mounted on the beam 190. By means of it the clutch block 226 may be thrown into engagement with the worm. The worm is properly directioned to give the shaft the proper movement to lift the clamp slides through the action of the pinions 211 upon the racks 210. The pinions are forced to rotate with the shaft through the action of the pins 213 and 214. As soon as the clutch is thrown in, therefore, the pin 213 engages the pin 214 and moves the slide up. It will be noted that the pin 214 is turned around by the lowering of the clamp to a position nearly in contact with the pin 213. It is necessary to positively stop the driving movement at a certain point, otherwise the machine would lock. To accomplish this a cam 229 is arranged in the path of a pin 231 on the clutch block 226. The cam is supported by the bracket 230. When the block 226 and with it the shaft 212 has made approximately one complete rotation, the pin 231 contacts the cam 229 and positively moves the block 226 out of engagement. In order to free the pinions from the shaft 212, so that each may be freely turned without turning the shaft to re-set them, I provide the return spring 232. This spring is fastened to the shaft 212, and to the bearing 212$^a$, and put under tension as the shaft is turned to lift the clamp slides. As soon as the clutch block 226 is forced out of engagement, the shaft is returned to its initial position as shown in Fig. 22, through the action of the spring 232. The pin 231 coming in contact with the side of the cam block acts as a stop for the shaft to which point it is returned with each operation.

In order to keep the net or web 14 taut, it is desirable to provide side cables 14$^a$, and when the table is lifted it is desirable to provide means for relieving the pins of the stress of the cables and for carrying the cable out far enough to assure the reëntry of the pins inside the cables. To accomplish this I have provided the mechanism shown in Figs. 14, 15 and 18. Fingers 237 extend up through slots 238 in each alternate strip 113. They are pivoted in the strips at 239. The strips have the shoulders 240 at their outer ends to prevent the cable from slipping over the ends of the strips. The levers 241 are fixed on the shaft 242. Each of these levers engages the lower end of a finger 237. The shaft 242 extends longitudinally of the table, and is mounted on the hangers 243. These hangers are secured to the beams 114. Arms 242$^a$ are fixed on the shaft near the end of the machine, and rods 244 are pivotally connected with these arms. The cross bars 245 are secured to these rods (see Fig. 15). The bars 245 engage the cross piece 111 as the table is raised and lowered and this limits the movement of the links 244 relatively to the movement of the table. After the links are stopped by the contact of the bars 245 with the cross piece 111 the continued movement of the table effects the rocking of the shaft 242 through the levers 242$^a$ and links 244. It will be readily seen, that as the table is lifted, the shaft 242 is rocked and the fingers 237 swung outwardly as they move upwardly. This outward movement is so arranged with relation to the movement of the table, that these fingers engage the cable and move it outwardly, so as to relieve the pin of strain and assure its reëntry. The finger is shown in its outward position at the left of Fig. 14.

In general the operation of the machine is as follows: The table is lifted through the action of the lever 121$^a$. The end clamps are run to a position to correspond to the length of the fabric, and the individual clamps are pulled down, so as to secure the fabric in position. The clamp beams with the side clamps are lowered and moved into the proper position, and the side clamps are pulled down as the material is shaped in position. After all the clamps are down the table is lowered to deposit the fabric on the carrier and over the pins. The end clamps are then lifted through the action of the lever 173, and the side clamps are lifted by throwing the lever 228. The carrier is started, and the beams carrying the side clamps lifted. As soon as the fabric or curtain on the carrier has moved off the table, the carrier is stopped and the action repeated. Of course different pieces of the fabric are in different tubs and in the drying chamber. The fabric is, however, completely laundried and returned to the table finished. It will be noted, that the pins where they engage the fabric maintain constant distances along the line of the fabric, so that the fabric is kept taut but is not strained. It will be noted also, that the raising of the table also disengages the fabric that has been laundried from the pins, so that the fabric can be readily moved.

What I claim as new is:

1. In an apparatus for treating fabrics, the combination of grooved sprockets; a carrier formed with the bars 98; connecting links 96 and 97, the links forming the joints 100 and 99 with the bars, the links having offsets opposite the joints 100 to permit the joint 99 to come into alinement with the joints 100 as the carrier is flexed; and rods arranged between the sprockets, the surfaces of the rods being in alinement with the axis of the joints 100 for the purpose described; and means for securing a fabric on the surfaces of the rods in alinement with the axis.

2. In an apparatus for treating fabrics, the combination of grooved sprockets; a carrier formed with the bars 98; connecting links 96 and 97, the links forming the joints 100 and 99 with the bars, the links having offsets opposite the joints 100 to permit the joints 99 to come into alinement with the joints 100 as the carrier is flexed; rods arranged between the sprockets, the surfaces of the rods being in alinement with the axis of the joints 100 for the purpose described; and the pins 101 on the bars 98 for securing the fabric.

3. In an apparatus for treating fabrics, the combination of a carrier on which the fabric is treated; devices on the carrier for securing the fabric thereto, a table for shaping the fabric; and means for transferring the fabric so shaped from the table to the carrier.

4. In an apparatus for treating fabrics, the combination of a carrier on which the fabric is treated; a table for shaping the fabric; means for transferring the fabric so shaped from the table to the carrier; and devices on the carrier for securing the fabric and acting automatically to secure the fabric as the transfer is made from the table to the carrier.

5. In an apparatus for treating fabrics, the combination of a flexible carrier on which the fabric is treated; devices on the carrier for securing the fabric; a table for shaping the fabric; means for maintaining a portion of the flexible carrier in a plane parallel to and adjacent to the table; and means for transferring the fabric so shaped from the table to the carrier.

6. In an apparatus for treating fabrics, the combination of a carrier upon which the fabric is treated; devices on the carrier for securing the fabric; a table for shaping the fabric; clamps for securing the fabric so shaped upon the table; and means for transferring the fabric from the table to the carrier.

7. In an apparatus for treating fabrics, the combination of a carrier on which the fabric is treated; a table for shaping the fabric; clamps for securing the fabric so shaped on the table; means for transferring the fabric from the table to the carrier; and automatic devices for securing the fabric on the carrier as the transfer is made.

8. In an apparatus for treating fabrics, the combination of a table; a series of individually operable clamps adapted to clamp a fabric on said table; a carrier on which the fabric may be treated; and means for transferring the fabric from the table to the carrier.

9. In an apparatus for treating fabrics, the combination of an open carrier having longitudinally and transversely arranged supporting surfaces; means for securing a fabric to be treated upon said carrier; and a table adapted to be passed through the carrier to bring its surface above the carrier, whereby fabric may be shaped on said table surfaces when above the carrier and secured to the carrier by the return of the table through the carrier.

10. In an apparatus for treating fabrics, the combination of a carrier on which the fabric is treated; pins arranged on the carrier and extending therefrom for securing a fabric thereon; a table for shaping the fabric; and means for transferring the fabric from the table to the carrier and into engagement with the pins upon the carrier.

11. In an apparatus for treating fabrics, the combination of an open carrier; means on the carrier for securing the fabric; a table adapted to pass through the carrier to bring its surface above the carrier whereby fabric may be shaped on said surface when above the carrier and secured to the carrier by the return of the carrier through the table; and clamps for securing the fabric upon the table.

12. In an apparatus for treating fabrics, the combination of an open carrier; means on the carrier for securing the fabric thereto; a table adapted to pass through the carrier to bring its surface above the carrier, whereby fabric may be shaped on said surface when above the carrier and secured to the carrier by the return of the carrier through the table; clamps securing the fabric on the table; said clamps being individually operable; and means acting on the clamps collectively for disengaging them.

13. In an apparatus for treating fabrics, the combination of a carrier formed of a series of bars carried by pivotally connected links; devices on the bars for securing the fabric to be treated thereon; and a table adapted to be passed through the carrier to bring its surface above the carrier, whereby fabric may be shaped on said surface when above the carrier and secured to the carrier by the return of the carrier through the table.

14. In an apparatus for treating fabrics, the combination of a flexible carrier on which the fabric is treated; devices for securing the fabric upon the carrier at numerous points; appliances for conducting the carrier, said appliances and carrier comprising devices acting together to maintain distances between the points constant; a table for shaping the fabric; and means for transferring the fabric from the table to the carrier.

15. In an apparatus for treating fabrics, the combination of a flexible carrier on which the fabric is treated; devices for securing the fabric upon the carrier at nucuring points; appliances for conducting the carrier and acting with the carrier to maintain the distances between the points constant; a table; a series of individually operable clamps adapted to clamp the fabric on said table; and means for transferring the fabric from the table to the carrier.

16. In an apparatus for treating fabrics, the combination of a carrier formed of a series of bars and pivotally connected supporting links; devices on the carrier for securing the fabric; and a table adapted to be passed through the carrier to bring its surface above the carrier, whereby fabric may be shaped on said surface when above the carrier and secured to the carrier by the return of the carrier through the table.

17. In an apparatus for treating fabrics, the combination of a carrier formed of a series of bars; mechanism connecting the bars; devices thereon for securing the fabric; a table formed of strips; and means for forcing the strips through the carrier and for returning the table for the purpose described.

18. In an apparatus for treating fabrics, the combination of a longitudinally movable carrier formed of a series of bars arranged transversely of the carrier; means for connecting the bars; a table formed of a series of strips; means for moving the table through the carrier; the strips passing between the bars; said table being free to move to register with the spacing between the bars.

19. In a apparatus for treating fabrics, the combination of a carrier formed of a series of bars; mechanism for connecting the bars; a table formed of a series of strips adapted to pass between the bars; means for lifting the table to bring its surface above the bars and for returning the table, the strips passing between the bars, said means comprising paralleling devices for maintaining the table in parallel planes in its different positions.

20. In an apparatus for treating fabrics, the combination of a table; a supporting bar extending across the table; means for moving the bar over the table comprising paralleling devices for maintaining the angular relation of the bar to the table; and a series of clamps on the bar, said clamps being individually operable.

21. In an apparatus for treating fabrics, the combination of a table; a supporting bar extending across the table; means for moving the bar over the table comprising paralleling devices for maintaining the angular relation of the bar to the table; a series of clamps on the bar, said clamps being individually operable; and appliances acting collectively on the clamps for returning the same.

22. In an apparatus for treating fabrics, the combination of a carrier on which the fabric may be treated; a table upon which the fabric may be shaped; a supporting bar extending across the table; a series of clamps on the supporting bar for clamping the fabric upon the table; and means for transferring the fabric from the table to the carrier.

23. In an apparatus for treating fabrics, the combination of a table upon which the fabric may be shaped; a supporting bar extending across the table; means for moving the bar over the table to position the same relatively thereto; a series of clamps upon the bar; and spring actuated mechanism tending to lift the clamp when the clamp is above a certain position, and to depress the clamp when the clamp is below a certain position.

24. In an apparatus for treating fabrics, the combination of a table; a supporting bar extending over the table; a clamp upon the supporting bar; a spring lever; a spring actuated connection between the lever and the clamp; a spring tending to lift the clamp with the spring lever in one position, and to depress the clamps with the spring lever in another position relatively to the clamp; and means for operating the spring lever to change its relation with the clamp to lift or depress the same as desired.

25. In an apparatus for treating fabrics, the combination of a table; a supporting bar; a series of clamps thereon; a spring lever for each clamp; a spring connection between the spring levers and clamps adapted to depress the clamps with a certain relation between the spring levers and clamps, and to lift the clamps with another relation between the spring levers and clamps, said clamps being individually operable with relation to said levers; and means for swinging said spring levers to actuate the clamps collectively.

26. In an apparatus for treating fabrics, the combination of a table; a rod extending across the table; a clamp lever pivotally mounted on the rod; a clamp on the clamp lever adapted to operate on the table; a spring lever fixed on the rod; a spring actuated connection between the clamp lever and spring lever; and means for swinging the spring lever to vary the action of the spring connection upon the clamp lever.

27. In an apparatus for treating fabrics, the combination of a table; a rod extending across the table; a carriage supporting the rod, and for moving the same across the table; paralleling devices for the carriage; a series of clamp levers pivotally mounted on the rod; clamps mounted on the levers and adapted to operate on the table; a series of spring levers fixed on the rod; spring connections between the clamp levers and the spring levers adapted to have their action reversed upon the clamp levers by movement of the spring levers; and means for swinging the rod to move the clamps collectively, the clamps being individually operable.

28. In an apparatus for treating fabrics, the combination of a table; a rod extending across the table; a carriage supporting the rod, and for moving the same across the table; paralleling devices for the carriage; a series of clamp levers pivotally mounted on the rod; clamps mounted on the levers and adapted to operate on the table; a series of spring levers adapted to have their action reversed upon the clamp levers by movement of the spring levers; and means carried by the carrier for limiting the downward movement of the clamp levers.

29. In an apparatus for treating fabrics, the combination of a table; a rod extending across the table; a carriage supporting the rod; and for moving the same across the table; paralleling devices for the carriage; a series of clamp levers pivotally mounted on the rod; clamps mounted on the levers and adapted to operate on the table; a series of spring levers adapted to have their action reversed upon the clamp levers by movement of the spring levers; and means for limiting relative movement of the clamp and spring levers.

30. In an apparatus for treating fabrics, the combination of a table; a series of end clamps; means adapted to carry said clamps longitudinally over the table; a series of side clamps; and a support for said side clamps movable crosswise of the table.

31. In an apparatus for treating fabrics, the combination of a series of individually operable clamps; and power driven mechanism for acting upon the clamps collectively to return the same, said mechanism comprising a clutch and a lock out mechanism for locking out or disengaging the clutch with a predetermined movement.

32. In an apparatus for treating fabrics, the combination of a table; a series of clamps; a support for said clamps; and a mounting for said support by which said support is movable vertically and horizontally.

33. In an apparatus for treating fabrics, the combination of a clamp slide; a slide support; a guide support on the slide support; a cam slide on the slide support having rounded ends; spring actuated fingers acting on the sides of cam slides and the rounded ends, one finger for holding the slide in the upper position, the other finger operating upon the top of the cam slide for depressing the same, and exerting pressure upon the clamp.

34. In an apparatus for treating fabrics, the combination of a clamp slide; a slide support; a guide support on the slide support; a cam slide on the slide having rounded ends; spring actuated fingers acting on the sides of the cam slides and the rounded ends, one finger for holding the slide in the upper position the other finger operating upon the top of the cam slide for depressing the same, and exerting pressure upon the clamp; and power driven mechanism for returning the clamp slide.

35. In an apparatus for treating fabrics, the combination of a table; a series of clamps; a series of clamp supports; guide supports for the clamp supports, said guide supports movable vertically and horizontally; and spring actuated fingers operating upon the clamp supports for locking the clamps in upper position, and for exerting clamping pressure upon the clamps in their lower position, said clamps being individually operable.

36. In an apparatus for treating fabrics, the combination of a table; a series of clamps; a series of clamp supports; guide supports for the clamp supports, said guide supports being movable vertically and horizontally; spring actuated fingers operating upon the clamp supports for locking the clamps in their upper position, and for exerting clamping pressure upon the clamps in their lower position, said clamps being individually operable; and means acting upon the clamps collectively for moving them out of engagement.

37. In an apparatus for treating fabrics, the combination of a carrier; a table acting in conjunction with the carrier from which the fabric may be transferred to the carrier; a series of clamps; and a support for a plurality of clamps adapted to be adjusted transversely to accommodate different widths of fabric.

38. In an apparatus for treating fabrics, the combination of a carrier; a table acting in conjunction with the carrier and from which the fabric may be transferred to the carrier; a series of clamps; and a support for a plurality of clamps adapted to be adjusted longitudinally of the table for clamping the ends of the fabric; and a series of clamps adapted to be adjusted transversely to accommodate the different widths of fabric, said clamps being individually operable.

39. In an apparatus for treating fabrics, the combination of a carrier; a table acting in conjunction with the carrier and from which the fabric may be transferred to the carrier; a series of clamps adapted to be adjusted longitudinally of the table for clamping the ends of the fabric; a series of clamps adapted to be adjusted transversely to accommodate different widths of fabric, said clamps being individually operable; and means for actuating the clamps of each series collectively.

40. In an apparatus for treating fabrics, the combination of a carrier upon which the fabric is treated; a table from which the fabric may be transferred to the carrier by a movement of the table with relation to the carrier; and a series of clamps movable lengthwise of the table one series at each end thereof.

41. In an apparatus for treating fabrics, the combination of a flexible carrier on which the fabric is treated; means for supporting and conducting the carrier for the treatment of the fabric, said means comprising supports for maintaining the carrier while stationary in a table like position to receive an entire fabric to be treated; and means for securing the fabric at points along its sides while the carrier remains in said position.

42. In an apparatus for treating fabrics, the combination of an endless flexible carrier on which the fabric is treated; means for supporting and conducting the carrier for the treatment of the fabric, said means comprising supports for maintaining the carrier while stationary in a table like position to receive an entire fabric, and for conducting the carrier from said position in a circuitous path for the treatment of the fabric, and returning the carrier to said table like position, said path extending over the table like position.

In testimony whereof I have hereunto set my hand in the presence of two subscribing witnesses.

ARCHIBALD B. TOZER.

Witnesses:
H. C. LORD,
K. R. KANE.

It is hereby certified that the residence and State of incorporation of the assignee, in Letters Patent No. 1,123,427, granted January 5, 1915, upon the application of Archibald B. Tozer, of Cleveland, Ohio, for an improvement in "Machines for Treating Fabrics," was erroneously written and printed "Cleveland, Ohio, a corporation of Ohio," whereas said residence and State of incorporation should have been written and printed *Erie, Pennsylvania, a corporation of Pennsylvania;* and that the said Letters Patent should be read with this correction therein that the same may conform to the record of the case in the Patent Office.

Signed and sealed this 2nd day of February, A. D., 1915.

[SEAL.] R. F. WHITEHEAD,

*Acting Commissioner of Patents.*